US008136875B2

(12) United States Patent
Laake

(10) Patent No.: US 8,136,875 B2
(45) Date of Patent: Mar. 20, 2012

(54) CUP HOLDER AND PIVOTING ARMREST

(75) Inventor: Elizabeth T. Laake, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 12/503,339

(22) Filed: Jul. 15, 2009

(65) Prior Publication Data

US 2011/0012396 A1      Jan. 20, 2011

(51) Int. Cl.
A47C 7/62 (2006.01)
A47C 7/54 (2006.01)
(52) U.S. Cl. .......... 297/188.14; 297/411.32; 297/188.15
(58) Field of Classification Search ......... 297/188.14–188.17, 411.32
See application file for complete search history.

(56) References Cited

U.S. PATENT DOCUMENTS

| 4,665,010 | A  | * | 5/1987  | Herd et al. ................. 430/330 |
| 5,096,152 | A  |   | 3/1992  | Christiansen et al. |
| 5,271,661 | A  | * | 12/1993 | Gould et al. ............. 297/188.15 |
| 5,275,779 | A  |   | 1/1994  | Marfilius et al. |
| 5,524,958 | A  | * | 6/1996  | Wieczorek et al. ....... 297/188.17 |
| 5,720,514 | A  |   | 2/1998  | Carlsen et al. |
| 6,238,002 | B1 |   | 5/2001  | Brewer et al. |
| 6,520,576 | B1 | * | 2/2003  | Burns et al. ............. 297/188.14 |
| 6,666,506 | B2 | * | 12/2003 | Burns et al. ............. 297/188.14 |
| 6,755,474 | B2 |   | 6/2004  | Magnuson |
| 7,104,609 | B2 |   | 9/2006  | Kim |
| 7,252,338 | B2 |   | 8/2007  | Crossman |

* cited by examiner

*Primary Examiner* — Sarah B McPartlin
(74) *Attorney, Agent, or Firm* — Clifford B. Vaterlaws, Esq.; Emerson Thomson Bennett

(57) ABSTRACT

Some embodiments relate to armrests equipped with cup holders, wherein the armrest is in pivotal communication with a seat frame member so that the armrest can be stowed and deployed. Some embodiments are also equipped with a locking mechanism that can maintain the armrest in a deployed and/or stowed configuration. Still further, some embodiments include structure for detecting whether the cup holder is occupied and either engaging or disengaging the locking mechanism accordingly. Thus, some embodiments are adapted to lock the armrest in a deployed configuration when a cup or other object is detected within the cup holder.

20 Claims, 3 Drawing Sheets

CUP HOLDER AND PIVOTING ARMREST

I. BACKGROUND

A. Field

This invention generally relates to armrests having cup holders.

B. Description of the Related Art

Pivotable vehicle seat armrests are known in the art, wherein the armrest can be pivoted between stowed and deployed configurations. Furthermore, it is known to use locking mechanisms in connection with pivotable armrests to lock the armrest in a deployed configuration until manually released by a user. Cup holders are also known in the art in connection with armrests. However, state of the art armrests equipped with cup holders have certain drawbacks. For example, such armrests allow the user to raise the armrest while an object remains in the cup holder. This can cause problems if, for instance, a drink or other object is in the cup holder.

Some embodiments of the present invention provide lockable pivoting armrests that prevent a user from stowing the armrest while it contains an object such as a cup.

II. SUMMARY

Some embodiments relate to an armrest assembly, comprising: a pivotable armrest member including a recess suitable for receiving a drinking cup in a seated relation; a frame member receiving the pivotable armrest member in a pivotal relation; a lockable pivoting anchor member linking an end of the pivotable armrest member to the frame member in a pivotal relation, wherein the pivoting anchor member can be locked in at least a deployed configuration; a locking mechanism operatively communicating with the pivoting anchor member and adapted to reversibly lock the pivoting anchor member in at least a deployed configuration; and an actuator operatively communicating with the locking mechanism and adapted to trigger the locking mechanism to engage the pivoting anchor member when the actuator detects a foreign object in the recess.

Some embodiments relate to an armrest assembly, comprising: a pivotable armrest member including a cup holder defining a generally annular sidewall extending downward from a top surface of the armrest, and the cup holder including a bottom wall generally perpendicular to the sidewall; a frame member receiving the pivotable armrest member in a pivotal relation, the frame member comprising a portion of a vehicle seat frame; a locking mechanism in locking communication with the armrest member; and an actuator communicating with the cup holder and adapted to cause the locking mechanism to engage the armrest member in a locked relation when a cup is present in the cup holder, and wherein the actuator is adapted to cause the locking mechanism to disengage the armrest member when a cup is not present in the cup holder.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
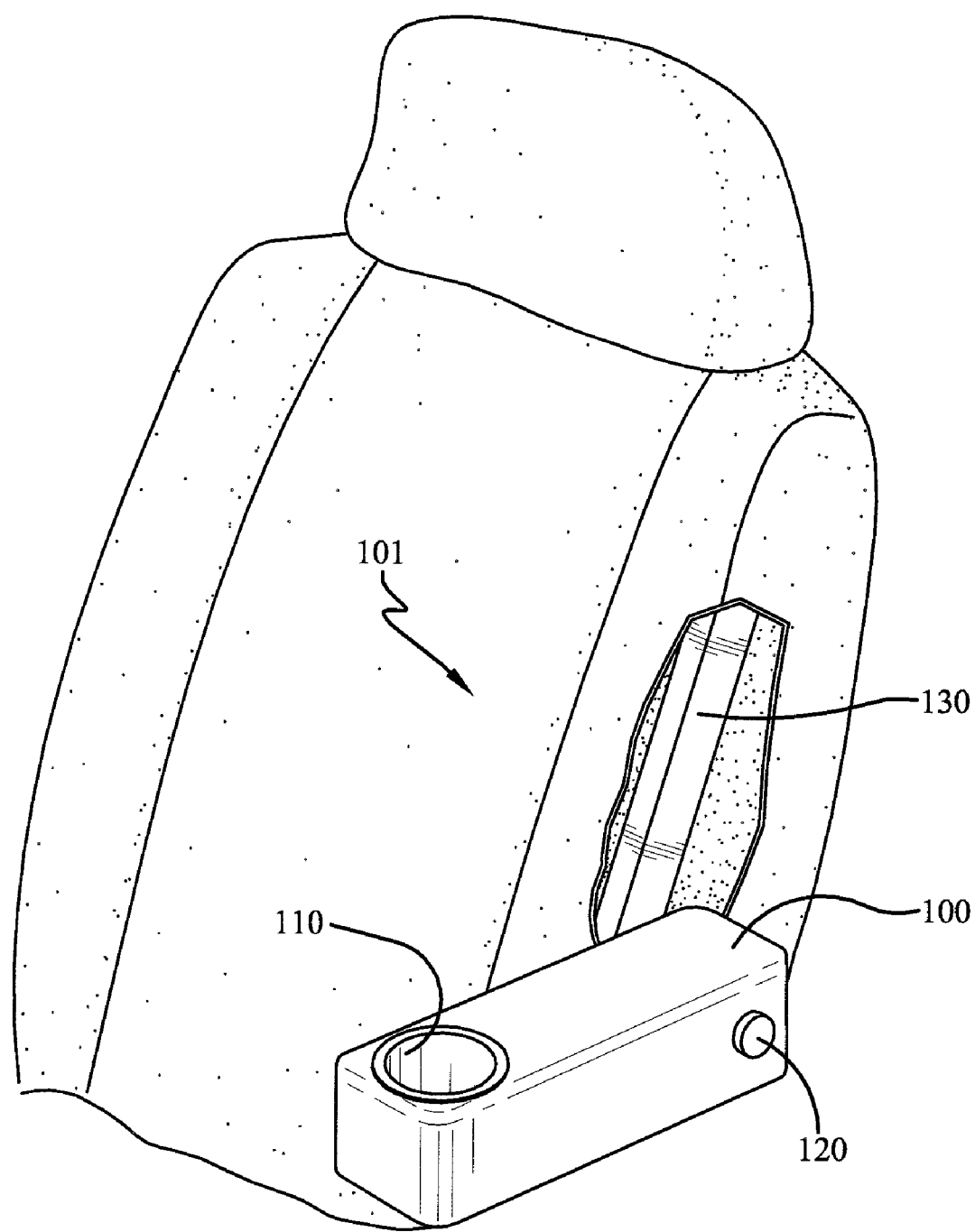
FIG. 1 is a perspective view of an embodiment in the context of a vehicle seat assembly.

According to some embodiments, a pivotable armrest includes a cup holder and a means for locking the armrest in a deployed configuration when a cup and/or other object is contained in the cup holder. Some embodiments can include a means for manually locking and/or unlocking the armrest. Furthermore, the means for locking and/or unlocking can be enabled or disabled depending on whether a cup or other object is contained in the cup holder.

In one embodiment a pivotable armrest assembly includes an armrest member and a seat frame member. The armrest member can be pivotally joined to the seat frame member through a pivoting means such as a hinge, pin, rod or similar structure. The armrest member can include a recess suitable for receiving a cup in a seated relation. The recess can include one or more actuators for sensing the presence of a cup or other object in the recess and causing a locking mechanism to engage the pivoting means in a locking relation when a cup or other object is present in the cup holder. Accordingly, when a cup or other object is determined to be present in the cup holder, the locking mechanism engages the pivoting means and thereby locks the arm rest in a deployed configuration.

A suitable actuator can include a light source and a light detector positioned at approximately 180 degrees from the light source, i.e. a transmittance mode arrangement. According to such embodiments, an object is sensed when the light beam is broken. Alternatively, a suitable actuator can have a light source and light detector arranged in a reflectance mode, wherein the source and detector are, for instance, at approximately zero degrees relative to each other or otherwise closely spaced apart. According to such embodiments, an object is sensed when sufficient light is reflected upon the detector. One of skill in the art will recognize that a wide variety of devices can be appropriate. For instance, some light sources can include light emitting diodes (LEDs) such as, without limitation, visible, infrared, and/or near infrared LEDs. Suitable light sources produce light that is discernable from the background light present under operating conditions.

One of skill in the art will appreciate that a suitable detector depends on the wavelength of the selected light source. For instance, one suitable detector for visible light can include a photodiode, such as a silicon photodiode. Suitable infrared detectors can include one or more of thermistors, thermocouples, pyroelectric materials, photoconductive materials, photovoltaic materials, bolometers, and/or Golay cells. More specifically, some suitable infrared detectors can comprise one or more of mercury cadmium telluride, mercury zinc telluride, indium gallium arsenide, germanium, lead sulfide, lead selenide, indium arsenide, indium antimonide, platinum silicide, or vanadium pentoxide.

Suitable actuators can also include mechanical means such as one or more depressible spring-loaded members. For example, an embodiment can include at least one spring-loaded plunger protruding vertically from a bottom of the cup holder recess. In this embodiment, the act of inserting a cup into the cup holder causes the plunger to be depressed. In some embodiments the plunger can, for instance, be operatively linked to a means for producing an electrical signal, e.g. a switch, which causes the locking mechanism to engage the pivoting means. In some embodiments the plunger can be operatively linked to a mechanical means for causing the locking mechanism to engage the pivoting means. Furthermore, in some embodiments a plurality of spring-loaded plungers disposed about a bottom of the recess defining the cup holder. In some embodiments, each plunger can be operatively coupled to an independent means for causing the locking mechanism to engage the pivoting means.

Referring now to the drawings wherein the showings are for purposes of illustrating embodiments of the invention only and not for purposes of limiting the same, FIG. 1 is a perspective view of an automobile seat including an embodiment of the invention. According to FIG. 1, an armrest assembly 101 includes a pivotable armrest member 100 having a recess 110 defining a cup holder suitable for receiving a drinking cup or other object. The assembly 101 further comprises a frame member 130 that is a portion of the vehicle seat frame. The frame member 130 pivotally links to the pivotable armrest member 100 through a pivoting anchor member (not shown). A suitable pivoting anchor member can be any device adapted to attach the armrest member 100 to the frame member 130 in a pivotal relation, and adapted to be locked in a deployed configuration when predetermined conditions are met. According to FIG. 1, the assembly 101 further comprises a manually actuated button 120 for releasing and/or locking the armrest member 100 in a deployed and/or stowed relation. However, according to some embodiments, such button is disabled when an object is disposed within the cup holder.

Figure 2:
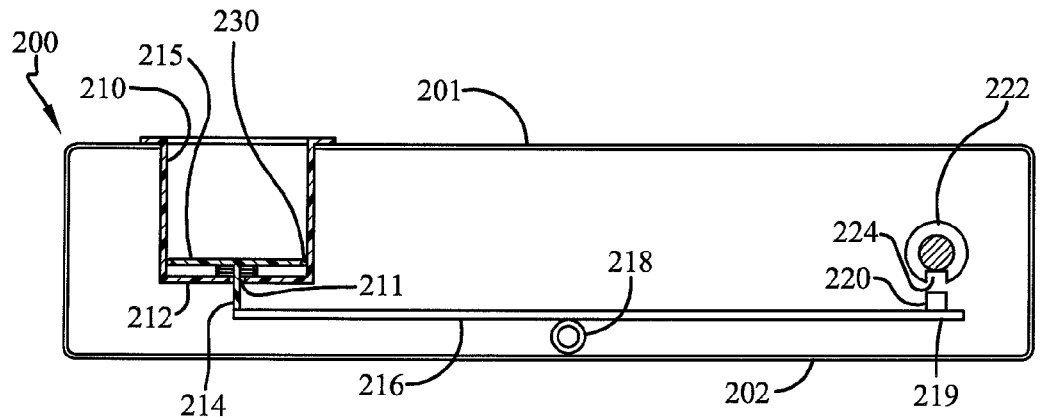
FIG. 2 is a side cross sectional view showing an embodiment having a plunger actuator.

FIG. 2 is a side cross sectional view of an armrest member 200 of an embodiment. The armrest member 200 includes a recess defining a generally annular wall 210 extending from a top surface 201 toward a bottom surface 202 of the armrest 200, and forming a generally annular bottom 212 of the recess. According to FIG. 2, the bottom 212 of the recess includes a through-hole 211 in a central location. The armrest member 200 further comprises a plunger including a generally annular disc 215 supported by a generally vertical plunger shaft 214. The disc 215 can be spaced apart from the annular wall 210, and can be in a sealing relation with the annular wall 210 through a circumferential gasket 230. Further according to FIG. 2, the plunger also comprises a lateral lever member 216 extending from the vertical plunger shaft 214. The lateral lever 216 is in pivotal communication with a fulcrum 218 at a region between the ends of the lateral lever 216. The fulcrum 218 can be attached to opposing sides of the armrest member 200, for instance, through welding or other suitable means known in the art. Furthermore, the fulcrum 218 can comprise a roller arranged to roll with the motion of the lateral lever 216. At one end 219 of the lateral lever 216 is a locking pin 220 in a fixed relation to the lateral lever 216, which can be mated in a locking relation with a locking pin seat 224 defined by a recess in pivot rod 222, the pivot rod 222 comprising a pivoting anchor member. The pivot rod 222 can comprise, for instance, a hinge passing through both an end of the armrest member 200 and an end of a frame member such as 130. One of skill in the art will recognize that the pivot rod 222 can be in a moveable relation to the armrest member 200, thereby allowing the pivot rod 222 to remain stationary while the armrest member 200 pivots about the pivot rod 222. One of skill in the art will also recognize that a wide variety of pivoting means can be appropriate to pivotably connect the armrest member 200 to the seat frame 130.

Figure 3:
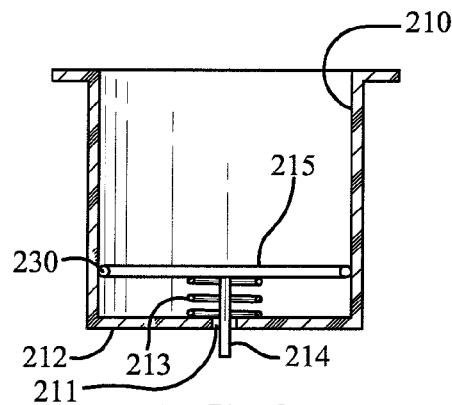
FIG. 3 is a side cross sectional view of a plunger actuator according to one embodiment.

FIG. 3 is a close-up cross view of the cup holder shown in FIG. 2. The annular side wall is shown in relation to the disc 215, and a circumferential gasket member 230 is shown forming a seal between the disc 215 and the annular wall 210. Additionally, a coil spring 213 is shown in a coaxial relation to the plunger shaft 214, and disposed between the disc 215 and the bottom 212 of the cup holder. The spring 213 is shown biasing the disc 215 upward and away from the bottom 212 of the cup holder. Accordingly, the spring 213 functions to disengage the locking pin 220 from the locking pin seat 224 when the cup holder is empty. Conversely, the spring force must be overcome by the contents of the cup holder in order to engage the locking pin 220 with the locking pin seat 224.

Figure 4:
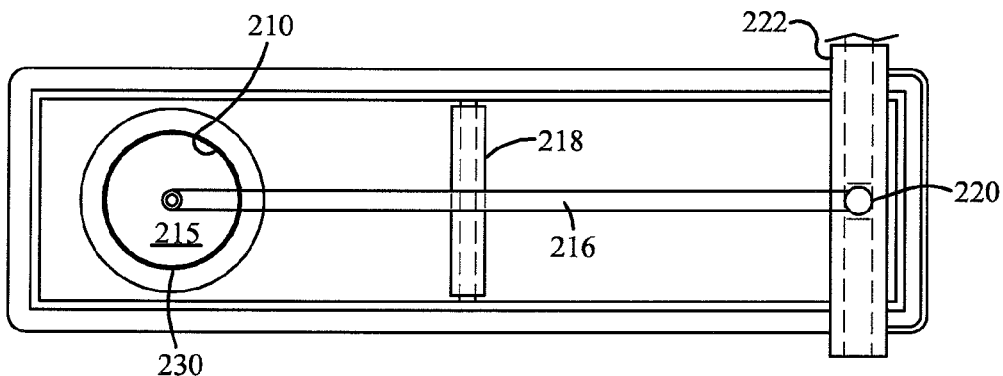
FIG. 4 is a top cut-away view of an embodiment having a plunger actuator.

FIG. 4 is a top cross sectional view of the armrest member 200. The disc 215 is shown in relation to the annular wall 210, and a circumferential gasket 230 is shown forming a watertight seal therebetween. The fulcrum 218 is shown supporting the lateral lever 216, and attaching at either end to opposing inner walls of the armrest member 200. The locking pin 220 is shown positioned under the pivot rod 222.

Figure 5:
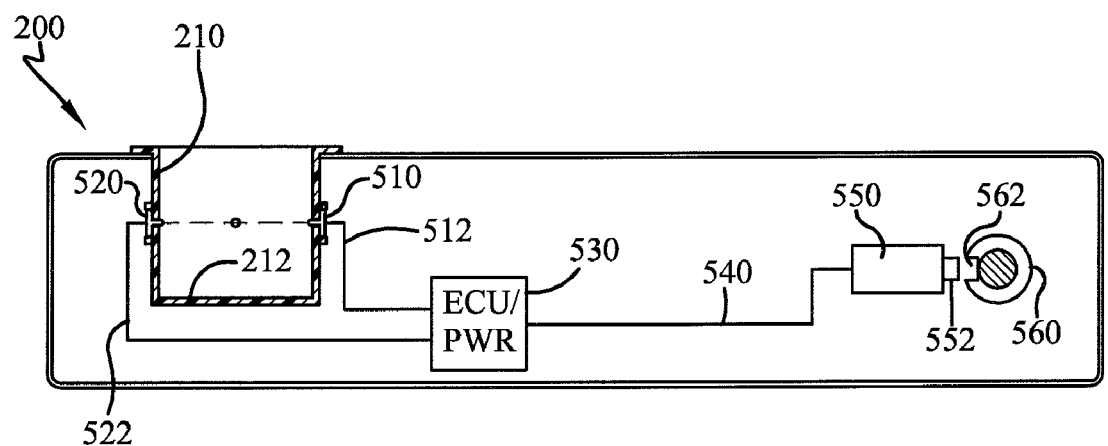
FIG. 5 is a side cross sectional view of an embodiment having an electronic actuator.

FIG. 5 is a side cross sectional view of an armrest member 200 according to another embodiment. According to FIG. 5, the armrest member 200 includes a recess defining a generally annular wall 210 extending downward from a top surface of the armrest member 200 and further defining a bottom 212 of the recess. Furthermore, the armrest 200 includes a electromagnetic emitter 510 arranged at about 180 degrees from a corresponding electromagnetic detector 520. The armrest further comprises an electronic control unit (ECU) including a power supply 530. The emitter 510 is in electrical power communication with the ECU/power supply 530 through conductor 512. Similarly, the detector is in electronic data monitoring communication with the ECU/power supply 530 through conductor 522. According to this embodiment, when the light beam between the emitter 510 and detector 520 is broken, the ECU 530 electronically actuates solenoid 550 through conductor 540. As shown in FIG. 5, the solenoid armature is mechanically linked to a locking pin 552, so that actuating the solenoid 550 causes the locking pin 552 to extend and engage locking pin seat 562. The locking pin seat 562 is a recess defined in a pivot rod 560, which pivotally links the armrest 200 to a vehicle seat frame (not shown).

Figure 6:
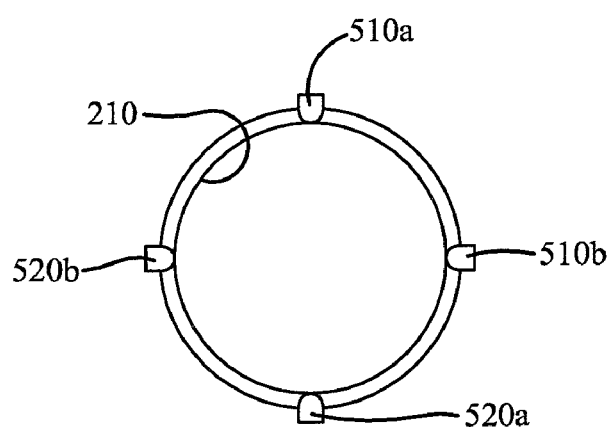
FIG. 6 is a plan view of an optical sensor assembly according to one embodiment.

FIG. 6 shows a plan view of a cup holder according to an embodiment. The embodiment has a first emitter/detector pair 510a, 520a and a second emitter detector pair 510b, 520b. In this embodiment, the pairs are arranged at about 90 degrees to each other and disposed in the annular wall 210 of the cup holder recess. Accordingly, if either or both light beams are broken, for instance, by an object being inserted in the cup holder, the ECU 530 will actuate the solenoid 550 and thereby cause the armrest to be locked in a deployed configuration.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. An armrest assembly, comprising:
   a pivotable armrest member including a recess suitable for receiving a drinking cup in a seated relation;
   a frame member receiving the pivotable armrest member in a pivotal relation;

a lockable pivoting anchor member linking an end of the pivotable armrest member to the frame member in a pivotal relation, wherein the pivoting anchor member can be locked in at least a deployed configuration;

a locking mechanism operatively communicating with the pivoting anchor member and adapted to reversibly lock the pivoting anchor member in at least a deployed configuration; and an actuator operatively communicating with the locking mechanism and adapted to trigger the locking mechanism to engage the pivoting anchor member when the actuator detects an object in the recess;

wherein the lockable pivoting anchor member comprises a pivot rod joining the armrest member to the frame member in a pivotal relation;

wherein the pivot rod includes an arcuate surface defining a seat for receiving a locking pin of the locking mechanism in a locked relation, the locked relation maintaining the armrest member in a deployed configuration; and, wherein the pivotable armrest member comprises a generally elongate structure having top surface suitable for supporting a human arm, a bottom surface generally opposing the top surface, a proximal end joined in pivoting communication with the frame member, a distal end generally opposing the proximal end, and the recess comprising a cup holder being disposed near the distal end of the pivotable armrest, the cup holder defining a generally annular wall penetrating the top surface of the pivotable armrest member and further defining a recess bottom.

2. The assembly of claim 1, wherein the frame member comprises a portion of a vehicle seat.

3. The assembly of claim 1, wherein the actuator comprises one or more of an optical sensor disposed in the generally annular wall, or a depressible spring-loaded plunger member disposed near a bottom of the recess.

4. The assembly of claim 3, wherein the actuator is an optical sensor that comprises an infrared LED source and an infrared detector arranged in either a reflectance mode or a transmittance mode.

5. The assembly of claim 4, further comprising an electronic control unit in electrical powering communication with one or more of the infrared LED source or infrared detector, and wherein the electronic control unit is in electronic data monitoring communication with the infrared detector, the electronic control unit receiving data indicating that the cup holder is in either an occupied or unoccupied state.

6. The assembly of claim 5, further comprising a solenoid in electronic controlling communication with the electronic control unit, the solenoid including a locking pin, wherein the electronic control unit instructs the solenoid to thrust the locking pin into the seat of the pivot rod in a locking relation when the electronic control unit receives a cup-holder-occupied signal.

7. The assembly of claim 3, wherein the actuator is a depressible spring-loaded plunger member that defines a generally annular disc member generally parallel to a bottom of the cup holder, the disc having a bottom face operatively communicating with a plunger shaft running in a generally vertical downward direction from the disc bottom face and penetrating a bottom of the cup holder recess via a through hole in the cup holder bottom, wherein the plunger further comprises a spring member disposed between the bottom face of the disc and a bottom of the cup holder recess, the spring biasing the disc in an upward direction.

8. The assembly of claim 7, wherein the plunger shaft extends to a lateral lever member, the lever member extending over and contacting a fulcrum member, and the lever member extending toward the pivot rod, the lever member including the locking pin at one end, and the locking pin being operatively spaced apart from the locking pin seat of the pivot rod in a disengaged relation, wherein depressing the plunger disc causes the locking pin to engage the locking pin seat in a locked relation.

9. An armrest assembly, comprising:
a frame member comprising a portion of a vehicle seat;
an armrest member pivotably attached to the frame member, the armrest member comprising a cup holder;
a locking mechanism for locking the armrest member with respect to the frame member;
an actuator in communication with the cup holder and the locking mechanism, the actuator causing the locking mechanism to lock the armrest member with respect to the frame member when a cup is in the cup holder and the actuator allowing the armrest member to pivot with respect to the frame member when a cup is not present in the cup holder; and,
wherein the actuator comprises an electric conductor extending from the cup holder to the locking mechanism.

10. The assembly of claim 9, wherein the actuator comprises at least one light source and at least one light detector adapted to detect light produced by the light source, wherein the light source and detector are arranged in one or more of a transmittance or reflectance mode.

11. The assembly of claim 10, further comprising an electronic control unit in electronic communication with the at least one light detector, wherein the light detector is adapted to transmit a signal to the electronic control unit indicating at least a cup holder occupied or cup holder unoccupied state.

12. An armrest assembly, comprising:
a pivotable armrest member including a cup holder defining a generally annular sidewall extending downward from a top surface of the armrest, and the cup holder including a bottom wall generally perpendicular to the sidewall;
a frame member receiving the pivotable armrest member in a pivotal relation, the frame member comprising a portion of a vehicle seat frame;
a locking mechanism in locking communication with the armrest member; and
an actuator communicating with the cup holder and adapted to cause the locking mechanism to engage the armrest member in a locked relation when a cup is present in the cup holder, and wherein the actuator is adapted to cause the locking mechanism to disengage the armrest member when a cup is not present in the cup holder.

13. The assembly of claim 12, wherein the actuator comprises at least one light source and at least one light detector adapted to detect light produced by the light source, wherein the light source and detector are arranged in one or more of a transmittance or reflectance mode.

14. The assembly of claim 13, further comprising an electronic control unit in electronic communication with the at least one light detector, wherein the light detector is adapted to transmit a signal to the electronic control unit indicating at least a cup holder occupied or cup holder unoccupied state.

15. The assembly of claim 14, wherein the locking mechanism comprises a solenoid including an armature having a locking pin defined on the armature, wherein the electronic control unit is adapted to energize the solenoid when a occupied state signal is received from the detector, the energized solenoid causing the locking pin to engage a locking pin seat in a locking relation, wherein the locking pin seat is defined on a portion of the frame member.

16. The assembly of claim 13, wherein the actuator comprises at least two light sources and at least two light detectors adapted to detect light produced by the at least two light sources.

17. The assembly of claim 12, wherein the actuator comprises a depressible spring-loaded plunger member disposed at a bottom of the cup holder, and mechanically communicating with the locking mechanism, and causing the locking mechanism to engage or disengage according to the compression state of the plunger.

18. The assembly of claim 17, wherein the locking mechanism comprises a locking pin in mechanical communication with the plunger member, the locking pin being caused to engage a locking pin seat in a locking relation when the plunger member is sufficiently depressed, and wherein the locking pin seat is defined on a portion of the frame member.

19. The assembly of claim 17, wherein:
the plunger member comprises: a generally annular disc that is positioned within the generally annular sidewall of the cup holder and positioned generally parallel to the bottom of the cup holder; and,
a gasket forms a seal between the generally annular disc and the generally annular sidewall.

20. The assembly of claim 17, further comprising: a lever having a first end operatively connected to the plunger member and a second end operatively connected to the locking mechanism, wherein the lever is in pivotal communication with a fulcrum positioned between the first and second ends of the lever.

* * * * *